Jan. 22, 1963    D. E. DEINES ET AL    3,074,215
BOX LOADING APPARATUS
Filed Oct. 13, 1960    5 Sheets-Sheet 1

INVENTOR.
Donald E. Deines
BY Raymond L. Willis
Wells & St John
Attys.

Jan. 22, 1963
D. E. DEINES ET AL
3,074,215
BOX LOADING APPARATUS
Filed Oct. 13, 1960
5 Sheets-Sheet 2
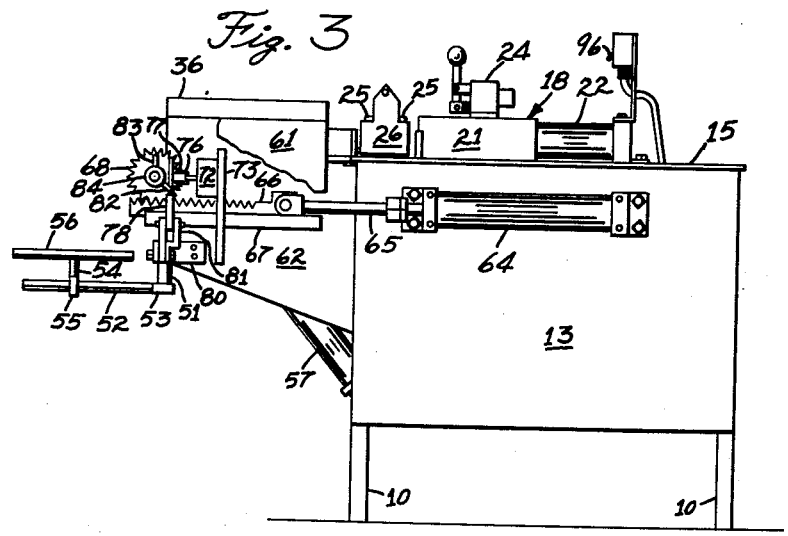
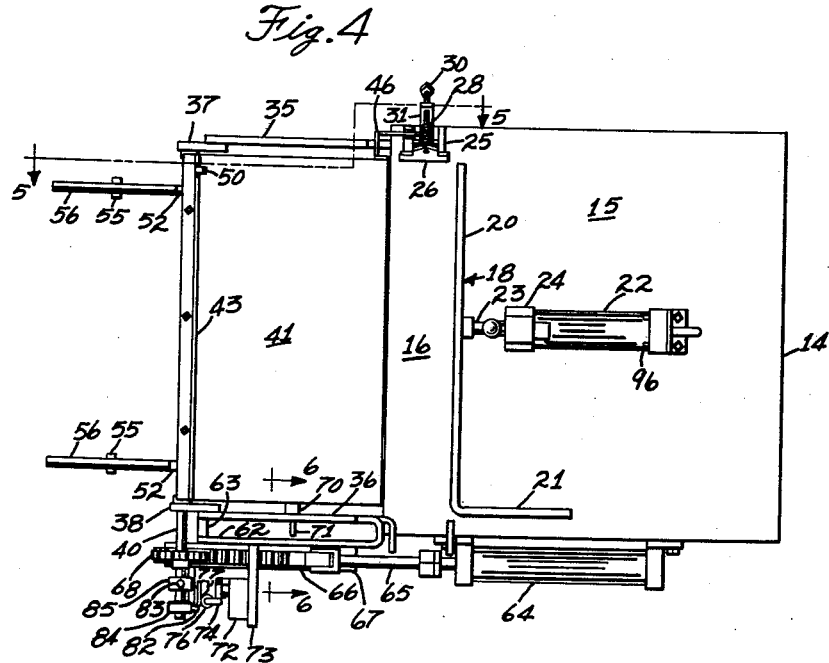
INVENTOR.
Donald E. Deines
BY Raymond L. Willis
Wells & St. John
Attys.

Jan. 22, 1963 D. E. DEINES ET AL 3,074,215
BOX LOADING APPARATUS
Filed Oct. 13, 1960 5 Sheets-Sheet 3

INVENTOR.
Donald E. Deines
BY Raymond L. Willis
Wells & St. John
Attys.

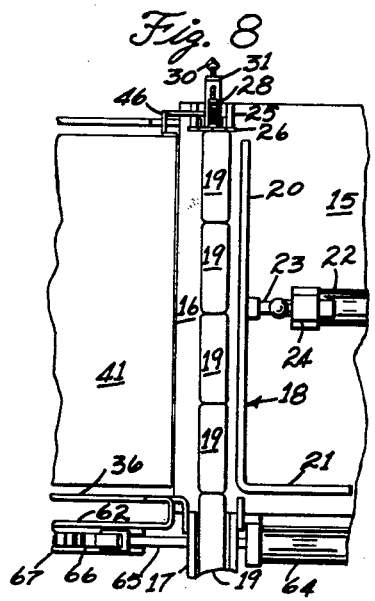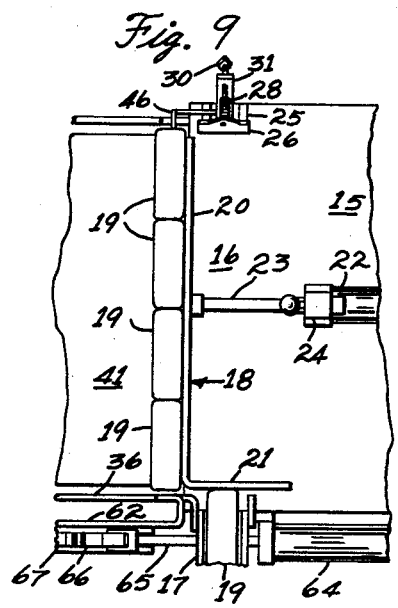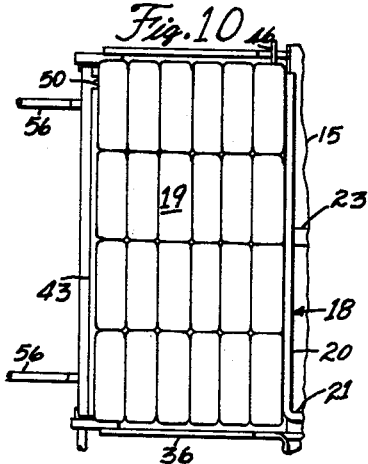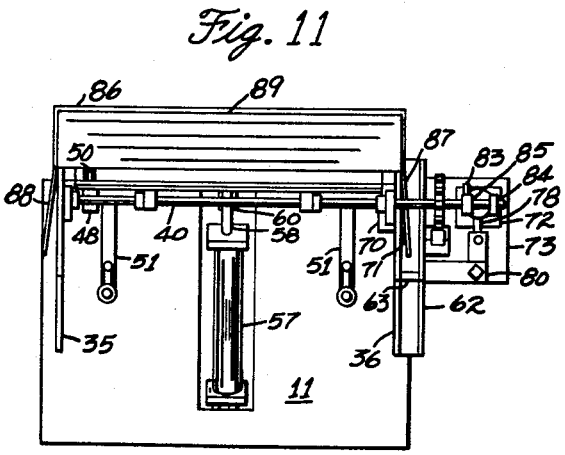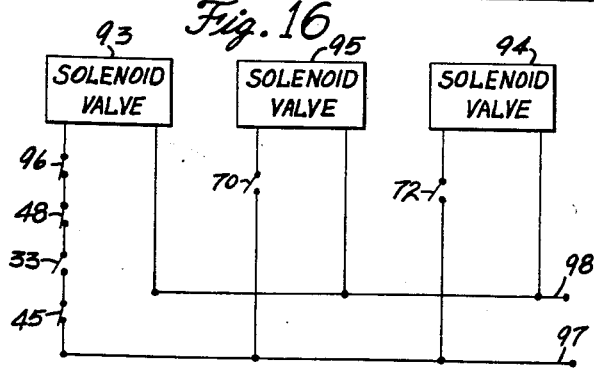

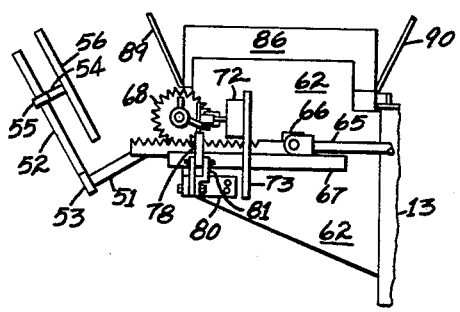
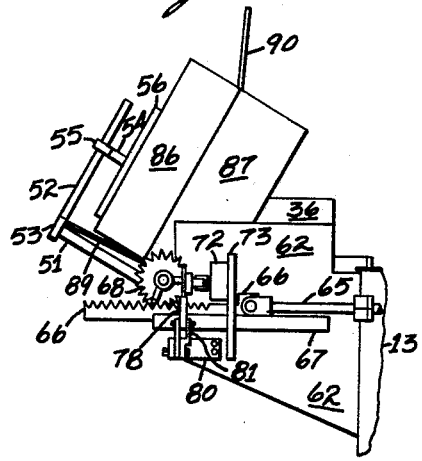
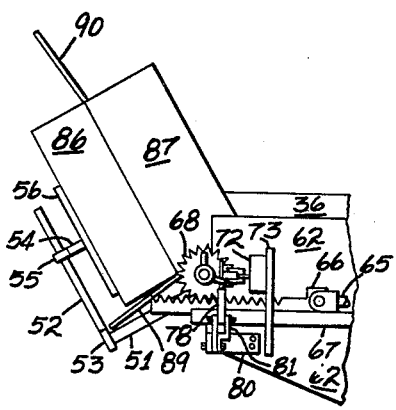
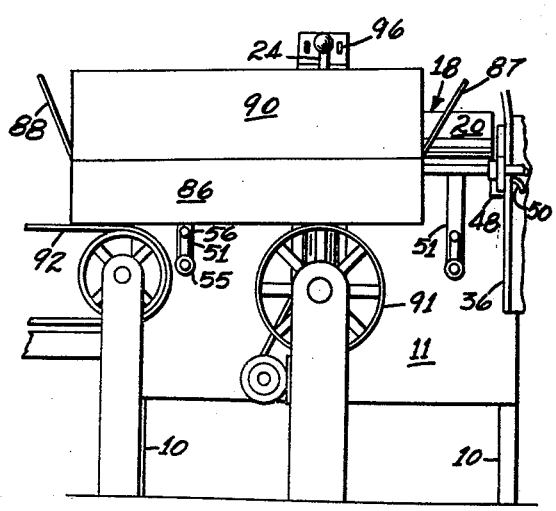

United States Patent Office 3,074,215
Patented Jan. 22, 1963

3,074,215
BOX LOADING APPARATUS
Donald E. Deines and Raymond L. Willis, Burlington, Wash., assignors to Cascade Frozen Foods, Inc., Burlington, Wash., a corporation of Washington
Filed Oct. 13, 1960, Ser. No. 62,475
6 Claims. (Cl. 53—243)

This invention relates to a novel machine for loading boxes semi-automatically and then inverting the loaded boxes for placement on a conveyor.

In the food packaging industry, such as those producing frozen foods, the final product is packaged in individual containers which must be arranged in boxes for shipment and storage. Normally the machines used to arrange and convey these containers are designed for the handling of high quantities of containers at high speeds so as to process the food without delay. The present invention is designed to arrange the containers in rows so as to fit a box, then to invert a box load after a box has been placed over the containers and to lower the inverted filled box to an adjacent conveyor for subsequent shipping procedures.

It is an object of this invention to provide such a machine which is capable of handling a high speed line of containers and which can arrange them for loading into boxes without any human intervention. The machine is designed to automatically arrange a predetermined pattern of containers on a plate and to block incoming containers when this arrangement is accomplished.

It is another object of the invention to utilize only one manual operation. This operation consists of simply placing an open box over the arrangement of containers. According to this invention this one operation is used to trigger the automatic inversion and placement of the loaded box on a delivery conveyor.

It is another object of this invention to provide a machine which automatically resets itself for subsequent arranging of containers without human intervention. The only manual step is the placement of the empty box over the containers.

It is another object of this invention to provide a simple machine using pneumatic cylinders as power elements and using electrical control circuits for maximum economy in maintenance.

These and further objects will be evident from a study of the following description and the accompanying drawings which illustrate a preferred form of the invention. This practical embodiment of the instant concepts is presented for purposes of illustration only and is not intended to limit or restrict the extent of the protection afforded by this disclosure, except as the invention is fully defined by the annexed claims.

In the drawings:

FIGURE 3 is a side view taken from the left hand side of FIGURE 1, with a portion of the protective cover broken away;

FIGURE 4 is a top view of the machine with the protective cover removed;

FIGURES 8–15 illustrate the sequence of operation;

FIGURE 8 is a fragmentary top view showing the delivery of containers to the machine;

FIGURE 9 is a view similar to FIGURE 8 showing the containers placed on the plate;

FIGURE 10 is a top view of the fully loaded plate;

FIGURE 11 is a front view of the machine with a box in place;

FIGURE 12 is a partial side view showing the initial movement of the fingers;

FIGURE 13 is a view similar to FIGURE 12 showing further movement of the fingers;

FIGURE 14 is a view similar to FIGURE 12 showing placement of the box on the fingers;

FIGURE 15 is a partial front view showing the box being carried on the final conveyor; and FIGURE 16 is a wiring diagram of the control circuits for the pneumatic cylinders.

Figure 1:
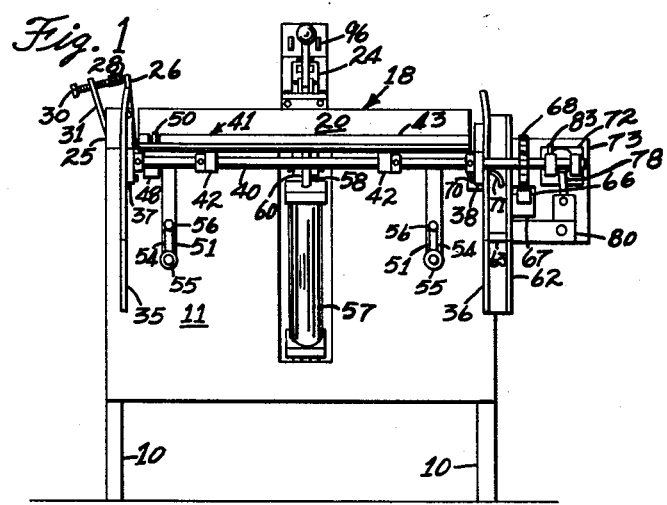
FIGURE 1 is a front view of the machine.
Figure 2:
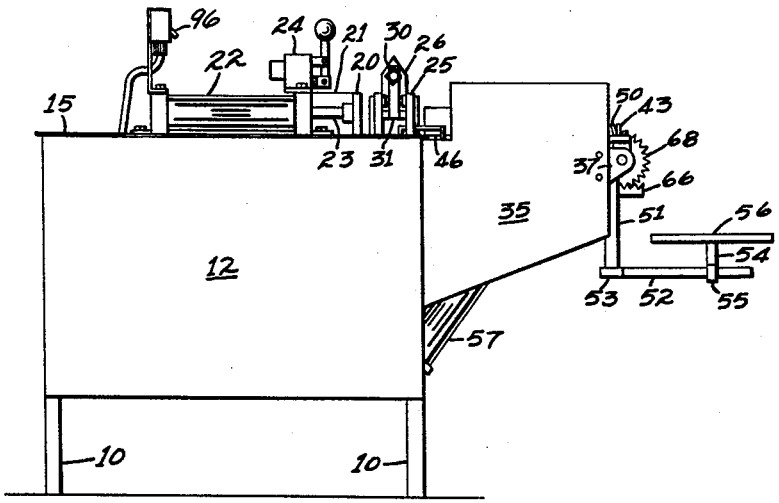
FIGURE 2 is a side view taken from the right hand side of FIGURE 1, with the protective cover removed.
Figure 5:
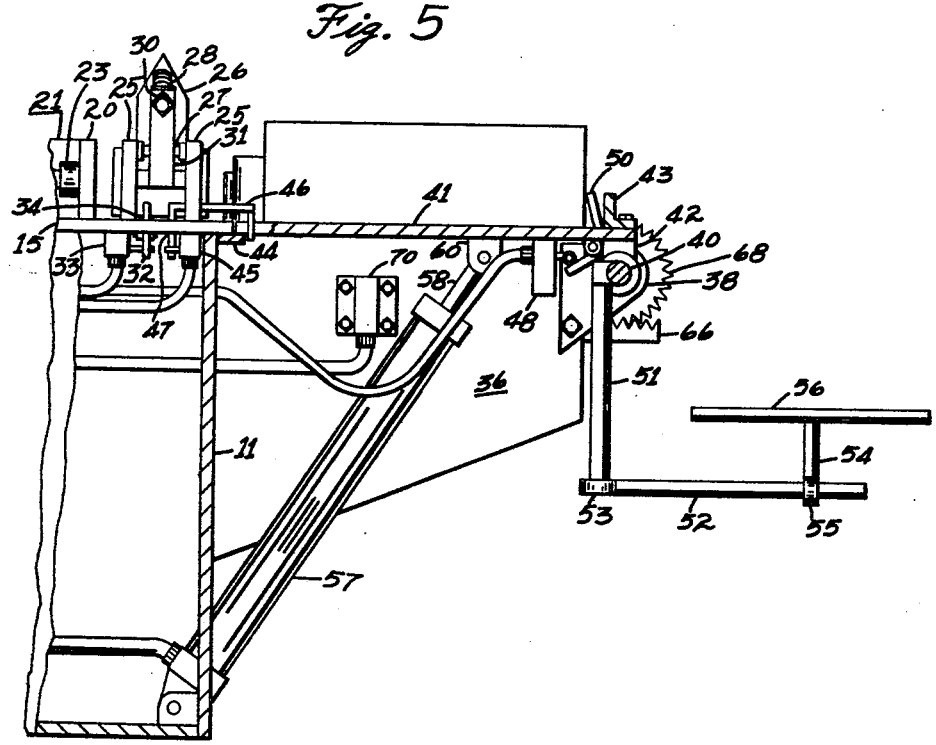
FIGURE 5 is an enlarged sectional view taken along line 5—5 in FIGURE 4.
Figure 6:
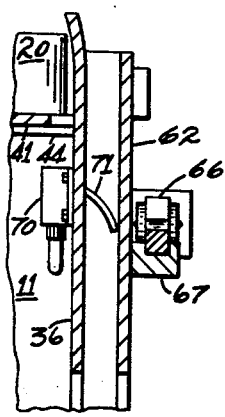
FIGURE 6 is an enlarged sectional view taken along line 6—6 in FIGURE 4.
Figure 7:
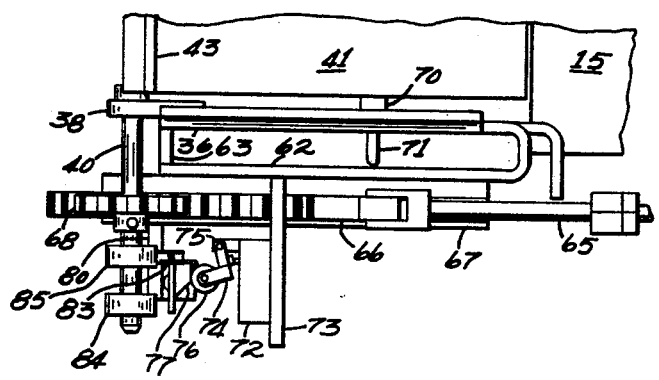
FIGURE 7 is an enlarged top view of the rack mechanism showing its operative position.

Referring now to the drawings, a practical embodiment of the invention is shown. The machine is supported on four legs 10 which are part of a rigid rectangular frame including a front wall 11 side walls 12, 13 and a rear wall 14. Also rigidly fixed as part of the frame is a table 15 including a horizontal smooth surface at the front which shall be denoted as the loading surface 16. The loading surface 16 is adapted to be positioned at the delivery end of a conveyor 17 (see FIGURE 8) which feeds a single line of containers to the machine. These containers are pushed by the conveyor across the loading surface 16 from right to left as viewed in FIGURE 1.

A pusher bar 18 is slidably mounted on table 15 and is designed for transverse motion across loading surface 16 perpendicular to the path of motion of the containers as propelled by conveyor 17. Pusher bar 18 includes a vertical longitudinal element 20 and an integral perpendicular element 21 bent back toward the rear of the machine. The overall appearance of pusher bar 18 is therefore an L-shaped configuration.

A first pneumatic cylinder 22 is fastened to the table 15 rearward of the pusher bar 18. The front end of the piston rod 23 is secured to the back wall of pusher bar 18 and thus can be used to move pusher bar 18 across loading surface 16.

The cylinder 22 is of conventional design and will not be explained in detail. The cylinder 22 is a double acting pneumatic cylinder which can be pneumatically pushed in either direction to move pusher bar 18. The travel of pusher bar 18 is limited between the position shown in FIGURE 8 wherein sufficient clearance is provided between longitudinal element 20 and the edge of loading surface 16 to accommodate the containers and second position shown in FIGURE 9 wherein the element 20 is located adjacent to the front edge of loading surface 16. In this second position, the element 21 serves to block travel of additional containers by conveyor 17.

Mounted above the cylinder 22 is a conventional air release valve 24 for use in case of emergency to relieve air pressure to cylinder 22.

Fixed to table 15 at the left hand end of surface 16 and directly adjacent to the open end of pusher bar 18 is a fixed stop comprised of two side supports 25 which pivotally mount a limit plate 26. The limit plate 26 is pivoted about a pin 27. The top end of plate 26 is biased by a light spring 28 whose tension can be adjusted by a bolt 30 mounted on an arm 31 secured in fixed relation to side supports 25. The lower end of plate 26 contacts a short pivoted actuating element 32 of a first micro-switch 33 whose function will be explained below. Micro-switch 33 is secured to the lower surface of table 15 and the element 32 extends through table 15 by means of a slot 34.

The rigid frame of this machine also includes a pair of spaced vertical plates 35, 36. These two plates 35, 36 are welded or otherwise fixed to the front wall 11 and are spaced from one another a distance slightly greater than the length of pusher bar 18. The vertical plates 35, 36 are extended above the elevation of table 15 and are beveled at their rear edges. At the forward edges of the plates 35, 36, and below the elevation of top table 15, are fixed two aligned bearing blocks 37, 38 respectively. Rotatably journalled by bearing blocks 37, 38 is a pivot shaft 40 which extends beyond block 38 to the right. A plate 41 is pivotally mounted on shaft 40 by two spaced bearing ears 42 fixed to its underside. Plate 41 has a rectangular flat upper surface terminating in a short vertical forward wall 43. The rear end of plate 41 rests on a ledge 44 which extends slightly below the forward edge of loading surface 16. When in its normal position shown in FIGURES 1 to 7, plate 41 is flush with the loading surface 16 and directly adjacent thereto.

A second micro-switch 45 is mounted on the lower surface of table 15 and has a vertically movable actuating lever 46 which projects forwardly of table 15 and upwardly through a slot 47. The lever 46 is adapted to be moved downward when the plate 41 is in its horizontal position resting on ledge 44. A third micro-switch 48 is mounted on the plate 41 on its under surface. The actuating element 50 for micro-switch 48 extends through the forward end of plate 41 and is located adjacent the forward wall 43. The element 50 is adapted to actuate micro-switch 48 when pushed forwardly so as to be flush with wall 43.

Secured to the pivot shaft 40 are two rods 51. Each rod 51 has attached thereto a perpendicular rod 52 by means of an adjustable mounting boss 53. Each rod 52 in turn carries a finger support consisting of an arm 54 mounted on rod 52 by an adjustable mounting boss 55. Rigidly joined to arm 54 is a finger 56 located parallel to rod 52. The pivot shaft 40 is movable to shift the fingers 56 from their normal position wherein the fingers 56 are angularly displaced 180 degrees from plate 41 to a second position above plate 41. The offset position of fingers 56 allows these fingers to come over plate 41 while remaining parallel thereto. Since both plate 41 and fingers 56 pivot about a common axis, the two can remain parallel through a given angle of simultaneous rotation. The adjustable bosses 53, 55 are used to accommodate various box sizes.

The manner by which plate 41 and fingers 56 are pivoted will now be explained. The plate 41 is pivoted by a second double acting pneumatic cylinder 57 whose base is pivotally mounted on front wall 11. The outer end of piston 58 in cylinder 57 is pivotally mounted about a horizontal axis by a pair of ears 60 which are fixed to the lower surface of plate 41 intermediate pivot shaft 40 and the forward edge of loading surface 16. By extending cylinder 57, the plate 41 can be pivoted from its horizontal position to a second position beyond the vertical, depending upon the length of ears 60 and the amount of travel of piston 58.

The mechanism for pivoting shaft 40 and thereby moving fingers 56 is enclosed in a protective housing 61 which is broken away in FIGURE 3 of the drawings for illustrative purposes. The only reason for housing 61 is to protect the machine operator from accidental injury to his clothing or body. Housing 61 is mounted on a vertical plate 62 spaced parallel to plate 36 by braces 63. Plate 62 is fastened to front wall 11 and is mounted flush with side wall 13. Fixed to side wall 13 is a third pneumatic cylinder 64 which has a horizontal piston 65 fixed to an extension rack 66. Rack 66 slides horizontally forward and rearward and is guided by a channel 67 fixed to plate 62. Rack 66 meshes with a large driving pinion 68 which is fixed to shaft 40 adjacent the outside surface of plate 62. Thus it can be seen that moving piston 65 to the left as seen in FIGURE 3 will result in fingers 56 being shifted angularly from the horizontal position to a second position above plate 41.

A fourth micro-switch 70 is mounted on vertical plate 36 below the normal position of plate 41. The actuating element for micro-switch 70 is a pivoted lever 71 which extends through a slot in plate 36 between the two plates 36 and 62. A fifth micro-switch 72 is mounted on a bracket 73 which extends perpendicularly to plate 62 and is apertured to clear the rack 66 and channel 67. The actuating lever 74 of micro-switch 72 is pivoted at 75 and terminates in a roller 76. Roller 76 rides on an inclined cam 77 which is pivoted by a bolt 78 through a second perpendicular bracket 80 which is also fixed the plate 62. The brackets 73, 80 are rigidly braced by means of a tie rod 81.

Cam 77 has rounded side edges which are used to pivot it about bolt 78. The edges are adapted to be slidingly contacted by a pair of spaced pins 82, 83 which are fixed to the end of pivot shaft 40 by collars 84, 85 respectively. The two pins 82, 83 are angularly spaced from one another. The micro-switch 72 is spring biased to hold the lever 74 in the position illustrated in FIGURE 4. When cam 77 is moved by pin 83, the cam 77 will push lever 74 toward micro-switch 72 to thereby activate it.

The general scheme of operation is quite simple. As containers 19 are fed in a line by conveyor 17, they will push one another across loading surface 16 until the first container 19 contacts the limit plate 26. This will actuate micro-switch 33 which in turn controls the first pneumatic cylinder 22. Cylinder 22 then pushes the containers 19 transversely across loading surface 16 and onto plate 41. The release of the containers 19 from limit plate 26 then de-activates the micro-switch 33 and results in the retraction of pusher bar 18. It is to be noted that while pusher bar 18 is located at its extended position adjacent the forward edge of loading surface 16, the element 21 will effectively block the entry of containers 19 to surface 16. This process will be repeated as successive rows of containers 19 are pushed across plate 41 to its forward wall 43. When the first row reaches this wall 43 it will push against actuating element 50 of micro-switch 48. This pressure will result in the disabling of cylinder 22 which will then retain the pusher bar 18 in its extended position to thereby block conveyor 17.

The next step is the manual placement of an empty box 86 over the arrangement of containers 19 on plate 41. The box 86 is placed upside down, with the side flaps 87, 88 extended straight from the box sides and with the front and rear flaps 89, 90 folded back outside the box. When this occurs, the side flap 87 will push lever 71 downward, thereby actuating micro-switch 70. This results in the extension of cylinder 64 to thereby bring fingers 56 to the position shown in FIGURE 13. When fingers 56 have been moved beyond the vertical, the pin 83 will shift cam 77 to thereby activate micro-switch 72. This raises cylinder 57 to thereby tilt the plate 41. The position of lever 71 is chosen so that lever 71 is released by side flap 87 at the precise moment that plate 41 reaches a position parallel to fingers 56. Then cylinders 64 and 57 will act in unison to move box 86 beyond the vertical and onto fingers 56. Pin 82 will then release micro-switch 72 and cylinder 57 will return the plate 41 to its normal position. During all this time, pusher bar 18 will be held inactive, first by micro-switch 45 and then by micro-switch 48 when plate 41 is tilted. When plate 41 again rests on ledge 44, switch 48 will be restored to normal and cylinder 22 can again reciprocate pusher bar 18 to load plate 41. The full box 86 will continue its angular motion about shaft 40 while resting on fingers 56. Fingers 56 deposit the box 86 on a conveyor roll 91 which pushes the loaded box to a final conveyor 92.

The controls for cylinders 22, 57 and 64, are conventional solenoid control valves 93, 94, 95 respectively. Each valve 93–95 is biased to a first position wherein the controlled cylinder is retracted. When an electrical circuit is completed to the solenoid of the valve, the valve is shifted to a position wherein the cylinder is extended. Such controls are conventional and well known.

The wiring diagram for the controls is shown in FIGURE 16. The micro-switches 33, 70 and 72 are normally open pressure actuated switches of conventional design. The micro-switches 45 and 48 are normally closed micro-switches of conventional design. A sixth switch 96 is provided on the machine as a manual control and is also normally closed during operation of the machine. The two power lines 97, 98 are connected to a suitable power source (not shown). Line 98 is connected directly to each solenoid valve 93, 94, 95. Interposed between line 97 and solenoid valve 93 are switches 33, 45, 48 and 96. If any one of these switches is open, the cylinder 22 will be retracted. Connected between solenoid valve 95 and line 97 is the micro-switch 70. Micro-switch 72 connects solenoid valve 94 to line 97. From this diagram the above operations should be obvious.

This invention can be modified to accept two rows of containers by increasing the area of loading surface 16 and adding an additional switch 33.

Various obvious modifications are possible without deviating from the spirit of this invention. Therefore, only the following claims are intended to limit the invention.

Having thus described our invention, we claim:

1. An apparatus for loading parallel rows of containers into boxes comprising a rigid frame, longitudinal feed conveyor means leading to said frame adapted to support containers on the top surface thereof, a horizontal plane loading surface on said frame positioned in longitudinal alignment with said feed conveyor means and adapted to support containers fed onto said surface by said feed conveyor means, a pusher bar mounted on said frame above said surface for reciprocable motion perpendicular to said feed conveyor means, a plate pivotally mounted on said frame adjacent said pusher bar about an axis parallel to the direction of travel of containers on said feed conveyor means, and spaced from said loading surface, said plate being positionable flush with said loading surface, said pusher bar being adapted to selectively push parallel rows of containers from said surface onto said plate, finger support means pivotally mounted on said frame about the pivotal axis of said plate adapted to selectively engage the bottom surface of a box placed in an inverted position over containers on said plate, first power means mounted on said frame operatively connected to said pusher bar adapted to selectively reciprocate said pusher bar, second power means mounted on said frame operatively connected to said finger support means adapted to selectively pivot said finger support means about its pivotal axis on said frame, and third power means mounted on said frame operatively connected to said plate adapted to selectively pivot said plate about its pivotal axis on said frame.

2. An apparatus as defined in claim 1 wherein said finger support means includes a plurality of spaced parallel arms offset radially from said axis and adapted to engage the bottom of a box being loaded.

3. The device as defined in claim 1 wherein said first, second and third power means comprise individual double acting pneumatic cylinders having reciprocable piston assemblies the motion of which is controlled respectively by first, second and third solenoid control valves, each of said solenoid control valves being biased to a first position adapted to effect retraction of the piston assembly of the respective cylinder controlled thereby and being movable to a second position adapted to effect extension of the piston assembly relative to the respective cylinder controlled thereby, and further comprising an electrical power circuit for said first solenoid control valve including a first normally open pressure actuated switch wired in series with said first solenoid control valve, said first switch being located at the terminal position of the containers on said loading surface adapted to be closed by a container at said terminal position on said surface, a second normally closed pressure actuated switch wired in series with said first switch and located at the terminal position of the containers on said plate adapted to be closed by a row of containers at said terminal position on said plate, an electrical power circuit for said second solenoid control valve including a third normally open switch mounted on said frame and wired in series with said second solenoid valve adapted to be closed by placement of a box over containers on said plate, and an electrical power circuit for said third solenoid control valve including a fourth normally open switch mounted on said frame and operatively connected to said second power means to be selectively closed thereby, said fourth switch being wired in series with said third solenoid control valve.

4. An apparatus for loading articles into boxes comprising a rigid frame, feed conveyor means leading to said frame, a horizontal loading surface on said frame aligned in end-to-end relationship with said feed conveyor means and adapted to hold one row of articles, a pusher bar mounted on said frame for reciprocal motion in a transverse direction above said loading surface, a plate having a rectangular configuration adapted to hold a plurality of rows of articles, a pivotal connection between said frame and said plate about an axis spaced from said loading surface, said plate being pivotable to a first position wherein said plate is level with and directly adjacent to said loading surface, support means pivotally mounted on said frame about said last named axis, said support means including a plurality of parallel arms offset from said last named axis adapted to engage the bottom surface of an inverted box placed over containers located on said plate, said support means being pivotable to a first position wherein said arms are located at an acute angle with respect to said first position of said plate and to a second position below the level of said plate and parallel to said first position, first power means on said frame operatively connected to said pusher bar, second power means on said frame operatively connected to said plate, and third power means on said frame operatively connected to said support means.

5. A box loading machine comprising a rigid rectangular frame, a horizontal top loading surface fixed to said frame, a pusher bar slidably mounted on said loading surface and including a transverse stop member at one end of said pusher bar, a first pneumatic cylinder assembly mounted on the top of said frame and having a reciprocable piston assembly connected to said pusher bar adapted to move said pusher bar across said loading surface, a fixed stop member mounted on said frame adjacent the end of said pusher bar opposite to said transverse stop member and located at the boundary of said loading surface, a plate pivotally mounted on said frame about a horizontal axis displaced from said loading surface, said plate being movable to a first position wherein it is flush with said loading surface and to a second position wherein it is positioned beyond the upright vertical position, a second pneumatic cylinder pivotally mounted on said frame about a horizontal axis and having a reciprocable piston assembly pivotally joined to the lower surface of said plate about a horizontal axis intermediate the pivotal axis of said plate and the loading surface, said plate including a fixed stop element extending upwardly along its outside edge opposite to said loading surface, a support apparatus pivotally mounted on said frame comprising a plurality of elements pivotally mounted on said frame about the pivotal axis of said plate, arms secured to said elements and extending in a plane separate from the plane of the pivotal axis, said arms being adapted to engage the bottom surface of an inverted box placed over containers located on said plate and being movable from a first position located 180 degrees from the first position of said plate, to a second position parallel to the second position of said plate, and a third pneumatic cylinder apparatus mounted on said frame and having a reciprocable piston assembly operatively connected to said elements.

6. The device as defined in claim 5 further comprising electrical controls for the machine, said first, second and third pneumatic cylinders being double acting, each of said cylinders being pneumatically controlled by a solenoid control valve adapted, when actuated, to extend its respective piston assembly and adapted, when not actuated, to return its respective piston assembly to its normal position, the power circuit for the solenoid valve of said first pneumatic cylinder including a first normally open switch having an actuating element adjacent to said loading surface on said fixed stop member, and a normally closed switch having an actuating element mounted on said fixed stop element of said plate adjacent the open plate surface, said two switches being wired in series with said solenoid control valve for the first pneumatic cylinder, the power circuit for the solenoid valve of said second pneumatic cylinder including a normally open switch operatively connected to said third pneumatic cylinder adapted to be closed thereby responsive to the angular position of said support apparatus, said last-named switch being wired in series with the solenoid control valve of said second pneumatic cylinder, the power circuit for said third pneumatic cylinder including a normally open switch mounted on said frame below one edge of said plate adapted to be closed upon placement of a box over said plate, said last-named switch being wired in series with the solenoid controlled valve for said third pneumatic cylinder.

References Cited in the file of this patent

UNITED STATES PATENTS

| | | |
|---|---|---|
| 2,508,698 | Von Beren | May 23, 1950 |
| 2,679,963 | Neal | June 1, 1954 |
| 2,786,316 | Silva | Mar. 26, 1957 |